US012798983B2

(12) United States Patent
Xie et al.

(10) Patent No.: US 12,798,983 B2
(45) **Date of Patent: *Nov. 17, 2026**

(54) **SYNTHESIS OF *MRE FRAMEWORK TYPE MOLECULAR SIEVES**

(71) Applicant: CHEVRON U.S.A. INC., San Ramon, CA (US)

(72) Inventors: Dan Xie, El Cerrito, CA (US); Kurt Owen Jensen, Richmond, CA (US); Adeola Florence Ojo, Pleasant Hill, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 18/604,633

(22) Filed: Mar. 14, 2024

(65) Prior Publication Data

US 2024/0228308 A1 Jul. 11, 2024

Related U.S. Application Data

(63) Continuation of application No. 17/703,067, filed on Mar. 24, 2022, now Pat. No. 11,964,875.

(51) Int. Cl.
*B01J 29/70* (2006.01)
*C01B 39/48* (2006.01)

(52) U.S. Cl.
CPC ............. *C01B 39/48* (2013.01); *B01J 29/703* (2013.01); *C01P 2002/72* (2013.01)

(58) Field of Classification Search
None
See application file for complete search history.

(56) References Cited

U.S. PATENT DOCUMENTS

| | | | |
|---|---|---|---|
| 4,397,827 A | 8/1983 | Chu | |
| 4,423,021 A | 12/1983 | Rollmann et al. | |
| 4,481,177 A | 11/1984 | Valyocsik | |
| 4,585,747 A | 4/1986 | Valyocsik | |
| 5,075,269 A | 12/1991 | Degnan et al. | |
| 5,098,685 A | 3/1992 | Casci et al. | |
| 5,681,789 A * | 10/1997 | Saxton | B01J 29/89 502/77 |
| 5,961,951 A | 10/1999 | Kennedy et al. | |
| 6,923,949 B1 * | 8/2005 | Lai | C01B 39/48 423/709 |
| 7,544,347 B2 | 6/2009 | Hastoy et al. | |
| 7,622,099 B2 | 11/2009 | Caullet et al. | |
| 7,771,703 B2 | 8/2010 | Guillon et al. | |
| 8,003,074 B2 | 8/2011 | Lai et al. | |
| 9,802,830 B2 | 10/2017 | Ojo et al. | |
| 10,604,413 B2 | 3/2020 | Xie et al. | |
| 10,640,389 B2 | 5/2020 | Xie | |
| 2006/0292070 A1 | 12/2006 | Hastoy et al. | |
| 2007/0134152 A1 | 6/2007 | Caullet et al. | |
| 2020/0061592 A1 * | 2/2020 | Kamakoti | B01J 29/7042 |
| 2022/0396741 A1 * | 12/2022 | Vincent | C10G 50/00 |

FOREIGN PATENT DOCUMENTS

| | | | |
|---|---|---|---|
| CN | 111573694 A | 8/2020 | |
| CN | 113365965 * | 9/2021 | |
| EP | 0046504 A1 | 3/1982 | |
| EP | 0142317 A2 | 5/1985 | |
| RU | 2740186 C2 | 1/2021 | |
| WO | WO-2022015491 A1 * | 1/2022 | B01J 29/7038 |

OTHER PUBLICATIONS

Allen W. Burton, Stacey I. Zones, Chapter 5—Organic Molecules in Zeolite Synthesis: Their Preparation and Structure-Directing Effects . . . Studies in Surface Science and Catalysis. 2007 (Year: 2007).*

A. Araya and B.M. Lowe "Zeolite Synthesis in the NH2{CH2)6NH2—Al2O3—SiO2—H2O System at 180oC" J_ Catal. 1984, 85, 135-142.

J.L. Schlenker, W.J. Rohrbaugh, P. Chu, E.W. Valyocsik and G.T. Kokotailo "The framework topology Jf ZSM-48 A high silica zeolite" Zeolites, 1985, 5, 355-358.

R.F. Lobo and H. Van Koningsveld "New Description of the Disorder in Zeolite ZSM-48" J_ Am. Chem. Soc. J002, 124, 13222-13230.

CE.A. Kirschhock, D. Liang, G. Van Tendeloo, A. Fecant, G. Hastoye, G. Vanbutsele, N. Bats, E. 3UILLON and J.A. Martens "Ordered End-Member of ZSM-48 Zeolite Family" Chem. Mater. 2009, 21, 371-380.

T. Willhammar and X. Zou "Stacking disorders in zeolites and open-frameworks—structure elucidation and analysis by electron crystallography and X-ray diffraction" Z. Krystallogr. 2013, 228, 11-27.

PCT International Search Report, International Application No. PCT/1B2023/051369, mailed Jul. 6, 2023.

T. Moteki, S.H. Keoh, T. Ohmura, K. Iyoki, T. Wakihara and T. Okubo "Synthesis of pure-silica ZSM-48 zeolite under mild hydrothermal condition with conventional amphiphilic cation by tuning the reactant gel composition" J. Ceramic Soc. Jpn. 2013, 121, 575-577.

M. Zhang, H. Long, D. Fan, L. Wang, Q. Wang, Y. Chen, L. Sun and C. Qi "Synthesis of ZSM-48 zeolites and their catalytic performance: a review" Catal. Sci. Technol., 2022, 12, 5097-5109.

(Continued)

*Primary Examiner* — Sheng H Davis
(74) *Attorney, Agent, or Firm* — Merchant & Gould PC

(57) ABSTRACT

A method is provided for synthesizing *MRE molecular sieves using an organic structure directing agent which comprises a 1-ethylpyridinium cation. The method provides an aluminosilicate molecular sieve of *MRE framework type which, in its as-synthesized form, comprises 1-ethylpyridinium cations in its pores.

6 Claims, 2 Drawing Sheets

(56) References Cited

OTHER PUBLICATIONS

D.P. Serrano, H-X. Li and M.E. Davis "Synthesis of Titanium-containing ZSM-48" J. Chem Soc, Chem. Commun. 1992, 745-747.
K.M. Reddy, S. Kaliaguine and A. Sayari "Synthesis of titanium containing silica ZSM-48 (TS-48) using hexamethonium hydroxide as template" Catal. Lett. 1994, 23, 169-173.
A. Tuel and Y.B. Tmrit "A new template for the synthesis of titanium silicalites with the ZSM-48 structure" Zeolites, 1995, 15, 164-170.

* cited by examiner

SYNTHESIS OF *MRE FRAMEWORK TYPE MOLECULAR SIEVES

CROSS-REFERENCE OF RELATED APPLICATIONS

This application is a continuation of U.S. patent application Ser. No. 17/703,067, filed Mar. 24, 2022, the disclosure of which is incorporated herein by reference.

FIELD

This disclosure relates to methods for preparing molecular sieves having *MRE framework topology.

BACKGROUND

Molecular sieves are a commercially important class of materials that have distinct crystal structures with defined pore structures that are shown by distinct X-ray diffraction (XRD) patterns and have specific chemical compositions.

Molecular sieves are classified by the Structure Commission of the International Zeolite Association according to the rules of the IUPAC Commission on Zeolite Nomenclature. According to this classification, framework type zeolites and other crystalline microporous crystalline materials, for which a structure has been established, are assigned a unique three-letter code and are described, for example, in the "*Atlas of Zeolite Framework Types*" (Elsevier, Sixth Revised Edition, 2007).

*MRE framework type molecular sieves are disordered materials with one-dimensional 10-ring channels. *MRE framework type molecular sieves have shown attractive properties as catalysts or catalyst components for the dewaxing of hydrocarbon feedstocks. Examples of *MRE framework type molecular sieves include COK-8, EU-2, EU-11, IZM-1, SSZ-91, ZBM-30, and ZSM-48.

A number of organic compounds have been shown to direct the synthesis of *MRE framework type molecular sieves including organic linear amine and polyamine compounds, diquaternary alkyl ammonium compounds and glycols.

According to the present disclosure, it has now been found that molecular sieves of *MRE framework type can be synthesized using an organic structure directing agent which comprises a 1-ethylpyridinium cation.

SUMMARY

In one aspect, there is provided a method of synthesizing a molecular sieve of *MRE framework type, the method comprising: (1) preparing a reaction mixture comprising: (a) a silicon atom source; (b) an aluminum atom source; (c) an organic structure directing agent [Q] which comprises a 1-ethylpyridinium cation; (d) a source of an alkali metal [M]; (e) a source of hydroxide ions; and (f) water; and (2) subjecting the reaction mixture to crystallization conditions sufficient to form crystals of the molecular sieve.

In another aspect, there is provided a molecular sieve of *MRE framework type and, in its as-synthesized form, comprising 1-ethylpyridinium cations in its pores.

DETAILED DESCRIPTION

Definitions

Figure 1:
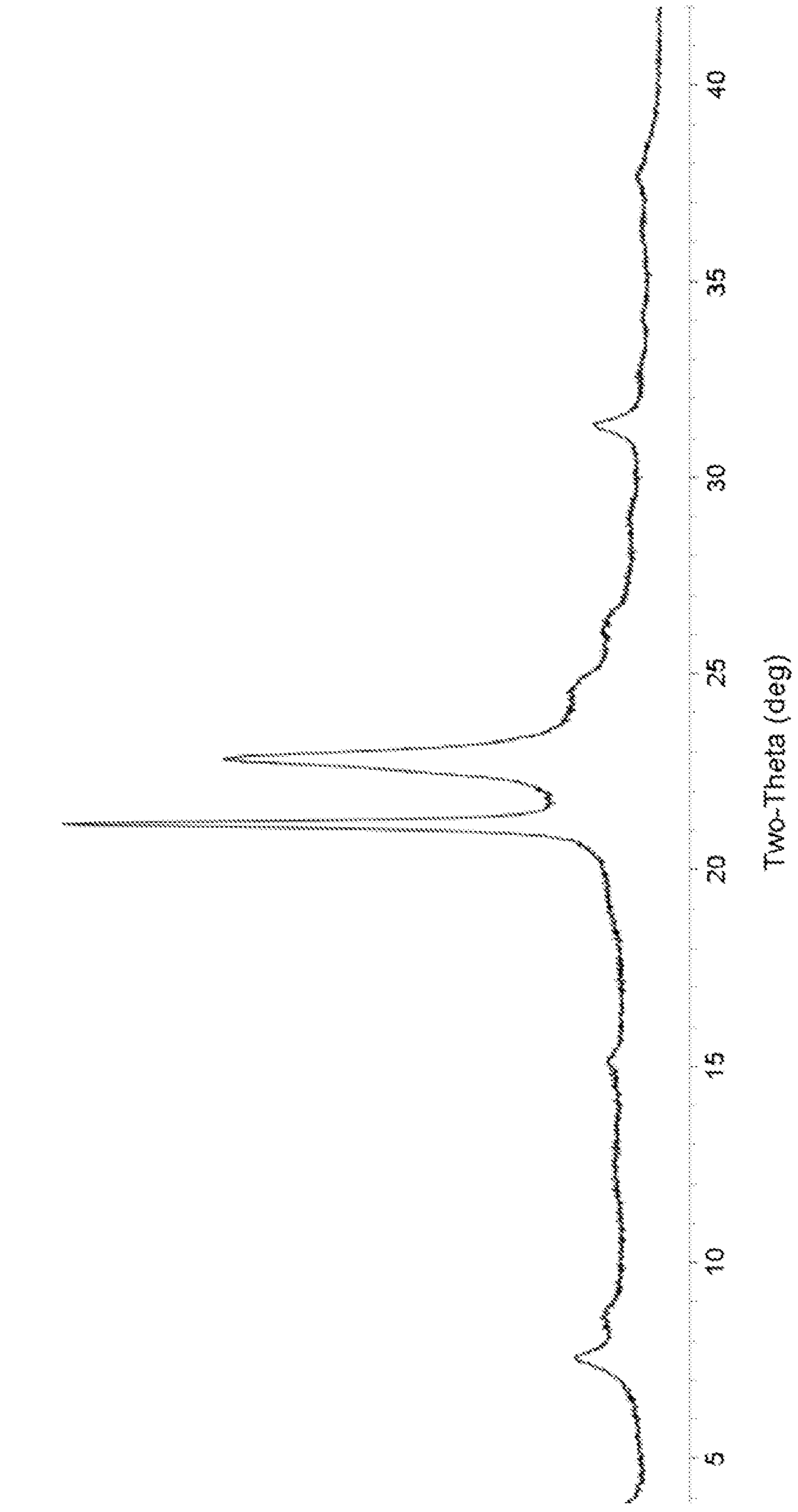
FIG. 1 shows a powder X-ray diffraction (XRD) pattern of an as-synthesized *MRE framework type material in accordance with Example 1.

The term "framework type" is used in the sense described in the "*Atlas of Zeolite Framework Types*," by Ch. Baerlocher, L. B. McCusker, and D. H. Olson (Elsevier, Sixth Revised Edition, 2007).

The terms "framework type" and "framework topology" are to be understood as being synonymous.

The term "as-synthesized" is employed herein to refer to a molecular sieve in its form after crystallization, prior to removal of the organic structure directing agent used in the synthesis of the molecular sieve.

Reaction Mixture

In general, a molecular sieve of *MRE framework type may be synthesized by: (1) preparing a reaction mixture comprising (a) a silicon atom source; (b) an aluminum atom source; (c) an organic structure directing agent [Q] which comprises a 1-ethylpyridininium cation; (d) a source of an alkali metal [M]; (e) a source of hydroxide ions; and (f) water; and (2) subjecting the reaction mixture to crystallization conditions sufficient to form crystals of the molecular sieve.

The reaction mixture may have a composition, in terms of molar ratios, within the ranges shown in Table 1.

TABLE 1

| Reactants | Useful | Exemplary |
|---|---|---|
| $SiO_2/Al_2O_3$ | ≥60 | 60 to 150 |
| $Q/SiO_2$ | 0.05 to 0.50 | 0.15 to 0.40 |
| $M/SiO_2$ | 0.10 to 0.80 | 0.20 to 0.50 |
| $OH/SiO_2$ | 0.10 to 0.80 | 0.20 to 0.50 |
| $H_2O/SiO_2$ | 10 to 60 | 15 to 40 |

wherein Q is the organic structure directing agent and M is the alkali metal.

Examples of silicon atom sources include colloidal suspensions of silica, precipitated silica, fumed silica, alkali metal silicates, tetraalkyl orthosilicates, and mixtures thereof.

Examples of aluminum atom sources include hydrated alumina, aluminum hydroxide, alkali metal aluminates, aluminum alkoxides, and water-soluble aluminum salts (e.g., aluminum nitrate), and mixtures thereof.

Combined silicon atom and aluminum atom sources can also be used, such as aluminosilicate zeolites (e.g., Y-zeolite). The aluminosilicate zeolite may be used as the sole or predominant source of both silicon and aluminum. The term "predominant" means greater than 50 mole %, suitably greater than 75 mole % and preferably greater than 90 mole %.

The alkali metal [M] may be selected from lithium, sodium, potassium, rubidium, cesium, or a mixture thereof. In some aspects, the alkali metal is selected from sodium and/or potassium. The alkali metal is typically introduced into the reaction mixture in conjunction with the source of hydroxide ions.

The organic structure directing agent [Q] comprises a 1-ethylpyridinium cation, represented by the following structure (1):

(1)

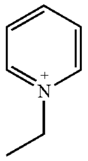

Suitable sources of Q are the hydroxide, chloride, bromide and/or other salts of the quaternary ammonium compound.

The reaction mixture may also contain seeds of a crystalline material, such as ZSM-48, from a previous synthesis, desirably in an amount from 0.01 to 10,000 ppm by weight (e.g., 100 to 5000 ppm by weight) of the reaction mixture. Seeding can be advantageous in decreasing the time necessary for complete crystallization to occur. In addition, seeding can lead to an increased purity of the product obtained by promoting the nucleation and/or formation of the desired molecular sieve over any undesired phases.

The reaction mixture components can be supplied by more than one source. Also, two or more reaction mixture components can be provided by one source.

The reaction mixture can be prepared by any conceivable means, wherein mixing by agitation is preferred, preferably by means of stirring. The reaction mixture can be prepared in batch, continuous, or semi-continuous mode.

The reaction mixture can be in the form of a solution, a colloidal dispersion (colloidal sol), gel, or paste, with a gel being preferred.

Crystallization and Post-Synthesis Treatment

Crystallization of the molecular sieve from the reaction mixture may be carried out under static or stirred conditions in a suitable reactor vessel, such as for example, polypropylene jars or Teflon lined or stainless steel autoclaves placed in a convection oven maintained at a temperature of from 100 °C to 200 °C for a period of time sufficient for crystallization to occur (e.g., from about 1 day to 21 days, or 1 day to 14 days, or 1 day to 7 days).

Once the desired molecular sieve crystals have formed, the solid product can be separated from the reaction mixture by standard mechanical separation techniques such as centrifugation or filtration. The recovered crystals are water-washed and then dried, for several seconds to a few minutes (e.g., 5 seconds to 10 minutes for flash drying) or several hours (e.g., 4 hours to 24 hours for oven drying at 75 °C to 150 °C), to obtain the as-synthesized molecular sieve crystals. The drying step can be performed under vacuum or at atmospheric pressure.

As a result of the crystallization process, the recovered as-synthesized crystalline molecular sieve product contains within its pore structure at least a portion of the organic structure directing agent (e.g., a 1-ethylpyridinium cation) used in the synthesis.

The organic structure directing agent can be removed by calcination, where the as-synthesized molecular sieve is heated under an oxidizing atmosphere, such as air or oxygen, a neutral atmosphere, such as nitrogen or other inert gas, or a reducing atmosphere, such as hydrogen. The atmosphere can be dry or can include water.

The temperatures used in calcination depend upon the components in the material to be calcined and generally are from 400 °C to 900 °C for approximately 1 to 8 hours. In some cases, calcination can be performed up to a temperature of 1200 °C. In applications involving the methods described herein, calcinations are generally performed at temperatures from 400 °C to 700 °C for approximately 1 to 8 hours, preferably at temperatures from 400 °C to 650 °C for approximately 1 to 4 hours.

Molecular sieves synthesized by the present method may include one or more extra-framework alkali metals. Usually, it is desirable to remove the alkali metal cation by ion exchange and replace it with hydrogen, ammonium, or any desired metal ion. Typical ion exchange techniques involve contacting the synthetic molecular sieve with a solution containing a salt of the desired replacing cation or cations. Although a wide variety of salts can be employed, chlorides and other halides, nitrates, sulfates and carbonates are particularly preferred. Representative ion exchange techniques are widely known in the art. Ion exchange occurs post-synthesis and can take place either before or after the molecular sieve is calcined. Following contact with the salt solution of the desired replacing cation, the molecular sieve is typically washed with water and dried at temperatures ranging from 65 °C to 200 °C (e.g., 80 °C to 150 °C). After washing, the molecular sieve can be calcined in an inert gas and/or air at temperatures ranging from 400 °C to 900 °C for periods of time ranging from 1 to 48 hours, or more, to produce a catalytically active and stable product.

Characterization of the Molecular Sieve

*MRE framework type molecular sieves synthesized by the methods described herein can have a $SiO_2/Al_2O_3$ molar ratio (SAR) of at least 60 (e.g., 60 to 150, or 60 to 140, or 60 to 130, or 65 to 150, or 65 to 140, or 65 to 130, or 70 to 150, or 70 to 140, or 70 to 130).

The *MRE framework type molecular sieve can contain less than 5 wt. % (e.g., less than 4 wt. %, or less than 3 wt. %, or less than 2 wt. %, or less than 1 wt. %) of non-*MRE materials. Examples of non-*MRE materials may include amorphous material, undissolved FAU, kenyaite and ZSM-50. In some aspects, the *MRE framework type molecular sieve may be free of non-*MRE materials. By "free of non-*MRE materials" is meant that non-*MRE solid materials, if any, are present in amounts that are not detectable by X-ray diffraction.

The X-ray powder diffraction patterns were determined by standard techniques. The radiation was the K-alpha/doublet of copper. Minor variations in the diffraction pattern values in the tables or the figures can also result from variations in the organic compound used in the preparation and from variations in the silica-to-alumina molar ratio from sample to sample. Notwithstanding these minor perturbations, the basic crystal structures for the as-synthesized and the calcined materials remain substantially unchanged.

EXAMPLES

The following illustrative examples are intended to be non-limiting.

Example 1

Figure 2:
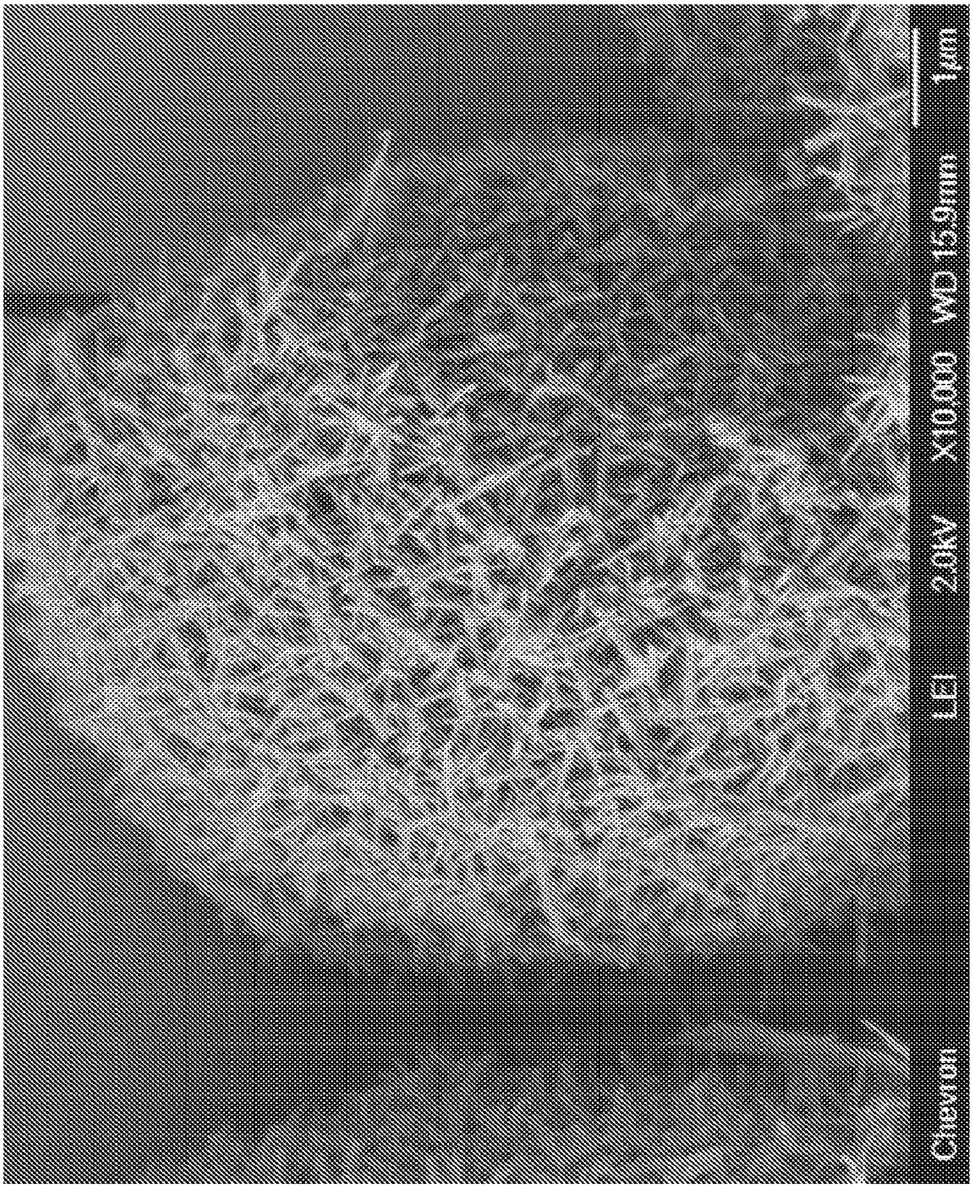
FIG. 2 shows a Scanning Electron Microscopy (SEM) image of an as-synthesized *MRE framework type material in accordance with Example 1.

0.24 g of 50% NaOH solution, 7.86 g of deionized water, 0.56 g of 1-ethylpyridinium bromide (TCI America), and 0.03 g of Reheis F-2000 hydrated alumina (53% $Al_2O_3$, 47% $H_2O$) were mixed together in a Teflon liner. Then, 4.00 g of LUDOX® HS-30 colloidal silica was added to the liner. The resulting gel was stirred until it became homogeneous. The liner was then capped and placed within a Parr Steel autoclave reactor. The autoclave was then put in an oven heated at 160 °C for 4 days. The solid products were recovered from the cooled reactor by centrifugation, washed with deionized water and dried at 95 °C Analysis of the dried product by powder XRD (FIG. 1) indicated that the product had the *MRE framework topology. A SEM image of the product is depicted in FIG. 2 and shows a uniform field of crystals.

The product had a $SiO_2/Al_2O_3$ molar ratio of 126.06, according to ICP elemental analysis.

Example 2

0.20 g of 50% NaOH solution, 8.90 g of deionized water, 0.63 g of 1-ethylpyridinium bromide, and 0.02 g of sodium aluminum oxide (Thermo Scientific) were mixed together in a Teflon liner. Then, 1.00 g CAB-O-SIL® M-5 fumed silica was added to the liner. The resulting gel was stirred until it became homogeneous. The liner was then capped and placed within a Parr Steel autoclave reactor. The autoclave was then put in an oven heated at 160 °C for 4 days. The solid products were recovered from the cooled reactor by centrifugation, washed with deionized water and dried at 95 C.

Analysis of the dried product by powder XRD and SEM indicated that the product had the *MRE framework topology.

The product has a $SiO_2/Al_2O_3$ molar ratio of 118.43, according to ICP elemental analysis.

Example 3

0.26 g of 50% NaOH solution, 11.47 g of deionized water and 1.00 g of CBV780 Y-zeolite (SAR=80) powder were mixed together in a Teflon liner. Then, 0.91 g of 1-ethylpyridinium bromide was added to the liner. The resulting gel was stirred until it became homogeneous. The liner was then capped and placed within a Parr Steel autoclave reactor. The autoclave was then put in an oven heated at 150 °C for 4 days. The solid products were recovered from the cooled reactor by centrifugation, washed with deionized water and dried at 95 °C Analysis of the dried product by powder XRD and SEM indicated that the product had the *MRE framework topology.

The product has a $SiO_2/Al_2O_3$ molar ratio of 83.70, according to ICP elemental analysis.

Example 4

0.39 g of 50% NaOH solution, 11.41 g of deionized water, 1.00 g of CBV760 Y-zeolite (SAR=60) powder were mixed together in a Teflon liner. Then, 0.91 g of 1-ethylpyridinium bromide was added to the liner. The resulting gel was stirred until it became homogeneous. The liner was then capped and placed within a Parr Steel autoclave reactor. The autoclave was then put in an oven heated at 160 °C for 6 days. The solid products were recovered from the cooled reactor by centrifugation, washed with deionized water and dried at 95 °C.

Analysis of the dried product by powder XRD and SEM indicated that the product had the *MRE framework topology.

The product has a $SiO_2/Al_2O_3$ molar ratio of 71.72, according to ICP elemental analysis.

Example 5

Calcination

The as-synthesized product of Example 1 was calcined inside a muffle furnace under a flow of air heated to 540 °C at a rate of 1 °C/minute and held at 540 °C for 5 hours, cooled and then analyzed by powder XRD. Analysis of the dried product by powder XRD indicated that the product remains stable after calcination to remove the organic structure directing agent.

Example 6

Ammonium Ion Exchange

The calcined material from Example 5 was treated with 10 mL (per g of molecular sieve) of a 1 N ammonium nitrate solution at 90 °C for 2 hours. The solution was cooled, decanted off and the same process repeated. The product ($NH_4$-form) after drying was subjected to a micropore volume analysis using $N_2$ as adsorbate and via the BET method. The molecular sieve exhibited a micropore volume of 0.07 $cm^3/g$.

Example 7

Palladium Ion Exchange

Palladium ion exchange was carried out on the ammonium-exchanged samples from Examples 1 and 2 each using tetraamminepalladium(II) nitrate (0.5 wt. % Pd). After ion-exchange, the samples were dried at 95 °C and then calcined in air at 482 °C for 3 hours to convert the tetraamminepalladium(II) nitrate to palladium oxide.

Example 8

Hydroconversion of n-Hexadecane (n-C16)

0.5 g of each of the palladium exchanged samples in Example 7 was loaded in the center of a 23 inch-long by 0.25 inch outside diameter stainless steel reactor tube with alundum loaded upstream of the catalyst for pre-heating the feed (total pressure of 1200 psig; down-flow hydrogen rate of 160 mL/minute (when measured at 1 atmosphere pressure and 25 °C); down-flow liquid feed rate of 1 mL/hour. All materials were first reduced in flowing hydrogen at about 315 °C for 1 hour. Products were analyzed by on-line capillary gas chromatography (GC) once every thirty minutes. Raw data from the GC was collected by an automated data collection/processing system and hydrocarbon conversions were calculated from the raw data.

Catalyst was tested at about 260 °C initially to determine the temperature range for the next set of measurements. The overall temperature range will provide a wide range of n-hexadecane conversion with the maximum conversion just below and greater than 96%. At least five on-line GC injections were collected at each temperature. Conversion was defined as the amount of n-hexadecane reacted to produce other products (including iso-nC16 isomers). Yields were expressed as weight percent of products other than n-C16 and included iso-C16 as a yield product. The results are presented in Table 2.

TABLE 2

| Results at 96% n-Hexadecane Conversion | | | |
|---|---|---|---|
| | Isomerization Selectivity [%] | Temperature [°F] | C4- Cracking [%] |
| Example 1 | 86.4 | 597.2 | 1.4 |
| Example 2 | 85.0 | 596.7 | 2.4 |

Good catalytic performance is dependent on the synergy between isomerization selectivity and temperature at 96% conversion, whilst minimizing undesirable catalytic cracking. These catalysts demonstrated desirable isomerization selectivity at 96% conversion. The catalysts also showed highly desirable temperature at 96% conversion whilst still maintaining very good isomerization selectivity. Additionally, undesirable catalytic cracking with concomitant high gas make was low reflected in the acceptable levels of C4-cracking.

The invention claimed is:

1. An aluminosilicate molecular sieve of *MRE framework type, and in its as-synthesized form, comprising 1-ethylpyridinium cations within its pores.

2. The aluminosilicate molecular sieve of claim 1, having a $SiO_2/Al_2O_3$ molar ratio of at least 60.

3. The aluminosilicate molecular sieve of claim 1, having a $SiO_2/Al_2O_3$ molar ratio in a range of from 60 to 150.

4. The aluminosilicate molecular sieve of claim 1, wherein the molecular sieve is free of non-*MRE materials.

5. The aluminosilicate molecular sieve of claim 1, wherein the molecular sieve contains less than 5 wt. % of non-*MRE materials.

6. The aluminosilicate molecular sieve of claim 5, wherein the non-*MRE materials comprise amorphous material, undissolved FAU, kenyaite, or ZSM-50.

* * * * *